US008321709B2

(12) United States Patent
Jin et al.

(10) Patent No.: US 8,321,709 B2
(45) Date of Patent: Nov. 27, 2012

(54) NOTEBOOK COMPUTER WITH SLEEP MODE FUNCTION

(75) Inventors: Lei Jin, Shenzhen (CN); Xu-Xing Yan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 494 days.

(21) Appl. No.: 12/564,930

(22) Filed: Sep. 23, 2009

(65) Prior Publication Data

US 2011/0055608 A1    Mar. 3, 2011

(30) Foreign Application Priority Data

Aug. 28, 2009    (CN) ............ 2009 1 0306261

(51) Int. Cl.
G06F 1/00    (2006.01)
G06F 1/32    (2006.01)
(52) U.S. Cl. ............ 713/323; 713/320; 713/300
(58) Field of Classification Search .......... 713/323
See application file for complete search history.

(56) References Cited

U.S. PATENT DOCUMENTS

| 5,606,303 | A  | * | 2/1997  | Suski ............... 338/210 |
| 6,044,473 | A  | * | 3/2000  | Kim ................ 713/320 |
| 6,067,116 | A  | * | 5/2000  | Yamano et al. ....... 348/372 |
| 6,760,851 | B2 | * | 7/2004  | Teshima et al. ...... 713/320 |
| 7,386,748 | B2 | * | 6/2008  | Andou ............... 713/330 |
| 7,424,631 | B2 | * | 9/2008  | Ishidera et al. ..... 713/320 |
| 7,428,142 | B1 | * | 9/2008  | Ligtenberg et al. ... 361/679.55 |
| 7,587,618 | B2 | * | 9/2009  | Inui et al. ......... 713/320 |
| 7,707,436 | B2 | * | 4/2010  | Tsukamoto .......... 713/300 |
| 7,953,031 | B2 | * | 5/2011  | Tsukamoto et al. ... 370/311 |
| 7,957,762 | B2 | * | 6/2011  | Herz et al. ......... 455/550.1 |
| 8,023,262 | B2 | * | 9/2011  | Ligtenberg et al. ... 361/679.55 |
| 2004/0227407 | A1 | * | 11/2004 | Nagai ............... 307/112 |

FOREIGN PATENT DOCUMENTS

CN    2427932 Y    4/2001

OTHER PUBLICATIONS

Li Yingxiong, Optical pass switch control device with power controlled by opening and closing up cover, Apr. 25, 2001, Dialog, CN 2427932, pp. 7.*

* cited by examiner

*Primary Examiner* — Suresh Suryawanshi
(74) *Attorney, Agent, or Firm* — Altis Law Group, Inc.

(57) ABSTRACT

An exemplary embodiment of notebook computer includes a main body, a display, and a proximity sensor. The display is pivotably connected to the main body. The proximity sensor is installed in the main body and includes an emitter and a receiver. The emitter is configured for emitting an emission. The receiver is configure for receiving the emission, determining if an included angle between the main body and the display is in a predetermined range based upon the received emission, and, if yes, generating a signal indicative of placing the notebook computer in the sleep mode.

13 Claims, 2 Drawing Sheets

NOTEBOOK COMPUTER WITH SLEEP MODE FUNCTION

BACKGROUND

1. Technical Field

The present disclosure relates to notebook computers and, particularly, to a sleep mode of notebook computer.

2. Description of Related Art

To manually force most current notebook computers to enter into a sleep mode, the display must be folded completely to the main body so as to push a sleep mode button installed in the main body using a protrusion on the side of a display. However, it may not always be convenient or desirable to completely close the notebook computer to put it to sleep, and to do so through complicated menu operations is not convenient either.

Therefore, it is desirable to provide a notebook computer to overcome the above-mentioned problems.

DETAILED DESCRIPTION

Figure 1:
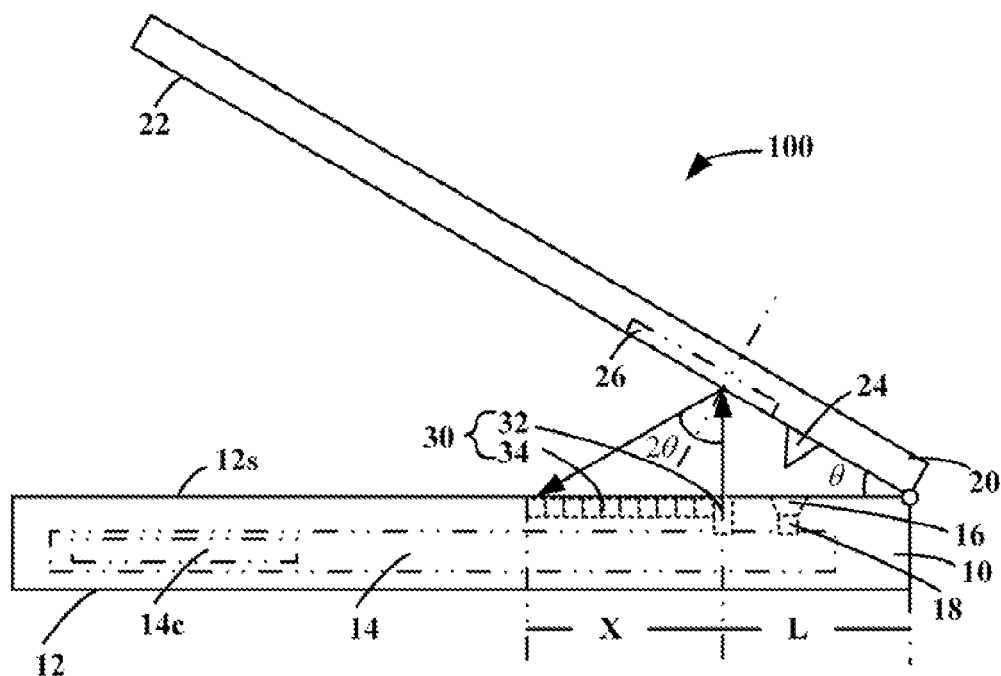
FIG. 1 is a schematic view of a notebook computer, according to an exemplary embodiment of the present disclosure.

Referring to FIG. 1, a notebook computer 100, according to an exemplary embodiment of the present disclosure, includes a main body 10, a display 20, and a proximity sensor 30.

Figure 2:
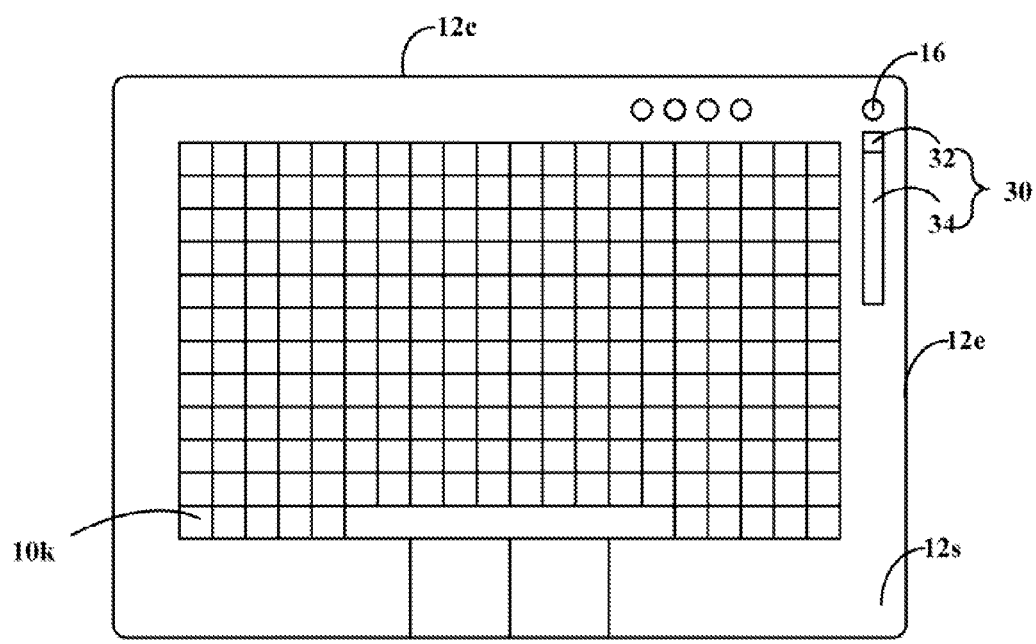
FIG. 2 is a top view of a main body of the notebook computer of FIG. 1.

Also referring to FIG. 2, the main body 10 includes a cuboid casing 12 which has a rectangular upper surface 12s, a main circuit board 14 accommodated within the casing 12, and a keyboard 10k generally mounted in the center of the upper surface 12s. The main circuit board 14 is configured for controlling various aspects of the notebook computer 100, including a work mode of the notebook computer 100, e.g., a normal mode or a sleep mode.

In particular, the upper surface 12s includes a connecting edge 12c and a side edge 12e perpendicularly connecting to the connecting edge 12c. The main body 10 also defines a small cavity 16, e.g., a conic cavity, in the upper surface 12s, outside the keyboard 10k and generally on a corner of an intersection of the connecting edge 12c and the side edge 12e, and further includes a sleep mode button 18 received within the cavity 16, which is exposed via the cavity 16 and electrically coupled to the main circuit board 14. In detail, the button 18 can be directly disposed on the main circuit board or indirectly connected to the main circuit board 14 via wires or a connecting circuit board (not shown). In this embodiment the button 18 is directly disposed on the main circuit board 18.

It should be understood that the positions and the shapes of the cavity 16 and the button 18 should not be limited to this embodiment, but can be changed depending on requirements. For example, in alternative embodiments, the cavity 16 can be a cylindrical cavity.

The display 20, such as a liquid crystal display (LCD), is a rectangular panel shaped and sized corresponding to the main body 10 and has one of four edges thereof pivotably connected to the connecting edge 12c. As such, the notebook computer 100 can be folded or unfolded by pivoting the display 20 towards or away from the main body 10. The display 20 has a displaying surface 22 that contacts the upper surface 12s when the notebook computer 100 is folded completely and, corresponding to the cavity 16, has a protrusion 24 protruding from the displaying surface 22. As such, when the notebook computer 100 is closed completely, the protrusion 24 fits into the small cavity 16 and pushes the button 18 causing the main circuit board 14 controls the notebook computer 100 to enter into the sleep mode.

In other alternative embodiments, the cavity 16 and the button 18 can be formed on the display 20 and the protrusion 24 is formed on the main body 10. The button 18 is connected to the main circuit board 14 via wires (not shown). In such a variant of the notebook computer 100, the sleep mode also can be activated when the notebook computer 100 is closed completely.

The proximity sensor 30 includes an emitter 32 and a receiver 34. Both of the emitter 32 and the receiver 34 are embedded into the upper surface 12s. The emitter 32 is configured for emitting an electromagnetic or electrostatic field, or a beam of electromagnetic radiation (infrared, for instance) along a direction substantially perpendicular to the upper surface 12s. Advantageously, to avoid interference between the emission of the emitter 32 and the emission of the display 20 (visible light), in this embodiment, the emitter 32 emits infrared light. The receiver 34 is electrically connected to the main circuit board 14 and is configured for receiving the emission of the emitter 32 and informing the main circuit board 14 to control the notebook computer 100 to enter into the sleep mode, when the emission is received.

Similar to the electrical connection between the button 18 and the main circuit board 14, the receiver 34 can be directly disposed on the main circuit board 14 or, alternatively, indirectly connected to the main circuit board 14 via wires or a connecting circuit board (not shown).

In particular, the emitter 32 and the receiver 34 are also located on the corner of the intersection of the connecting edge 12c and the side edge 12e, outside the keyboard 10k. The cavity 16, the emitter 32, and the receiver 34 are arranged in a line generally parallel to the side edge 12e and in this order from a near-end to a far-end of the connecting edge 12c. The emitter 32 has a physical area in the plane of the upper surface 12s substantially equal to an emission area thereof. The distance between the emitter 32 and the connecting edge 12c is represented as L. The physical area of the receiver 34 in the plane of the upper surface 12s is strip-shaped and connects the physical area of the emitter 32 in that plane. The receiver 34 is oriented substantially parallel to the side edge 12e and has a length X. As such, if an included angle θ between the main body 10 and the display 20 satisfies the following formula: L*tan θ*tan 2θ<X, the emission of the emitter 32 will be reflected by the displaying surface 22 onto the receiver 34. The formula can be transformed into:

$$\theta < \tan^{-1}\sqrt{\left(\frac{X}{L-X}\right)},$$

which indicates that, provided appropriate L and X, when θ is smaller than $$\tan^{-1}\sqrt{\left(\frac{X}{L-X}\right)},$$

the receiver 34 receives the emission of the emitter 32 and the notebook computer 100 enters into the sleep mode.

In use, the included angle θ must be in a range of 0°-45°. When the included angle θ is 0°, the emission of the emitter 32 is reflected back to the emitter 32 itself. When the included angle θ is equal to or greater than 45°, the emission of the emitter 32 is directly reflected outside the notebook computer 100.

Given the range of 0°-45° of θ, it is still beneficial to appropriately determine L and X, to maximally reduce the physical areas of the emitter 32 and the receiver 34 in the plane of the upper surface 22.

To increase the sensitivity of the proximity sensor 10, a high-reflective film 26 for the emission of the emitter 32 may be formed on an appropriate position of the displaying surface 22.

It should be mentioned that the proximity sensor 30, including the shapes, the positions and the position relationship of the emitter 32 and the receiver 34, is not limited to this embodiment. Other structures and/or arrangements of the proximity sensor 30 which can determine if the included angle θ in a desired range can be used too. For example, in other alternative embodiments, if a gap exist between the upper surface 12s and the displaying surface 22, the emitter 32 can be installed so that the emission thereof is slightly tilted toward the receiver 34. As such, even when the notebook computer 100 is completely folded (i.e., the included angle θ is 0°), the emission still can reach the receiver 34, and activation of the sleep mode can be done by the proximity sensor 30 without the button 18. Therefore, the structure of the cavity 16 and the protrusion 24 can be omitted.

Further, in other alternative embodiments, the proximity sensor 30 can be installed in the display 20.

With regard to ambient interference, it is beneficial to include a comparing unit 14c in the main circuit board 14. The comparing unit 14c is configured for comparing the received emission of the receiver 34 with a predetermined threshold. If the received emission of the receiver 34 is smaller than the predetermined threshold, it is deemed that the received emission is ambient noise. Otherwise, it is deemed that the received emission is from the emitter 32.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A notebook computer comprising:
   a main body comprising an upper surface;
   a display pivotably connected to the main body, comprising a displaying surface which faces the upper surface of the main body when the display is pivoted to the main body; and
   a proximity sensor, the proximity sensor comprising:
      an emitter embedded in the upper surface, configured for emitting an emission; and
      a receiver embedded in the upper surface, configured for receiving the emission, determining if an included angle between the main body and the display is in a predetermined range based upon the received emission, and generating a signal for activating the notebook computer into a sleep mode when the included angle is in the predetermined range;
   wherein the notebook computer further comprises a high-reflective film for the emission is formed at an appropriate position of the displaying surface; the emission is reflected by the high-reflective film onto the receiver when the included angle is in the predetermined range.

2. The notebook computer of claim 1, wherein the upper surface and the displaying surface are separate when the notebook is completely folded, and the direction of the emission is slightly tilted toward the receiver.

3. The notebook computer of claim 1, wherein the direction of the emission is perpendicular to the upper surface.

4. The notebook computer of claim 3, wherein the upper surface and the displaying surface are rectangular, the upper surface comprises a connecting edge to which the display is connected and a side edge connecting and perpendicular to the connecting edge, the physical area of the emitter on the upper surface being substantially equal to the area of the emission, the area of the receiver on the upper surface connecting the area of the emitter and being strip-shaped, the emitter and the receiver being arrange in a line parallel to the side edge and in this order from a near-end to a far-end from the connecting edge, when the included angle satisfies the following formula:

$$\theta < \tan^{-1}\sqrt{\left(\frac{X}{L-X}\right)},$$

the signal is generated, wherein θ is the included angle, X is the length of the area of the receiver on the upper surface, and L is the distance between the connecting edge and the emitter.

5. The notebook computer of claim 4, wherein the main body comprises a casing comprising an upper surface and a main circuit board accommodated within the casing and configured for controlling the notebook computer into the sleep mode, the receiver being electrically connected to the main circuit board.

6. The notebook computer of claim 4, wherein the main body defines a cavity, the main body further comprises a main circuit board configured for controlling the notebook computer to enter into the sleep mode and a sleep mode button received within but exposed via the cavity, the sleep mode button is electrically connected to the main circuit board, the display having a protrusion corresponding to the cavity, the protrusion being configured for fitting into the cavity and pushing the sleep mode button when the notebook computer is completely closed.

7. The notebook computer of claim 4, wherein the emission is selected from the group consisting of an electromagnetic, an electrostatic field, and a beam of electromagnetic radiation.

8. The notebook computer of claim 4, wherein the emission is infrared.

9. The notebook computer of claim 4, wherein a high-reflective film for the emission is formed at an appropriate position of the displaying surface.

10. The notebook computer of claim 4, wherein the main body comprises a upper surface, the display comprising a displaying surface which faces the upper surface when the display is pivoted to the main body, the emitter and the receiver being embedded in the displaying surface, the emission being reflected by the upper surface onto the receiver when the included angle is in the predetermined range.

11. The notebook computer of claim 4, wherein the main body defines a cavity and further comprises a main circuit board configured to control the notebook computer to enter into the sleep mode, and a sleep mode button received within but exposed via the cavity, the sleep mode button is electrically connected to the main circuit board, the display comprises a protrusion that is fitted into the cavity and configured to push the sleep mode button when the notebook computer is completely closed.

12. The notebook computer of claim 4, wherein the emission is infrared.

13. The notebook computer of claim 4, wherein the emission is selected from the group consisting of an electromagnetic, an electrostatic field, and a beam of electromagnetic radiation.

* * * * *